March 4, 1952      W. J. SMITH      2,587,914
METHOD OF MAKING GLASS
Original Filed Oct. 9, 1943
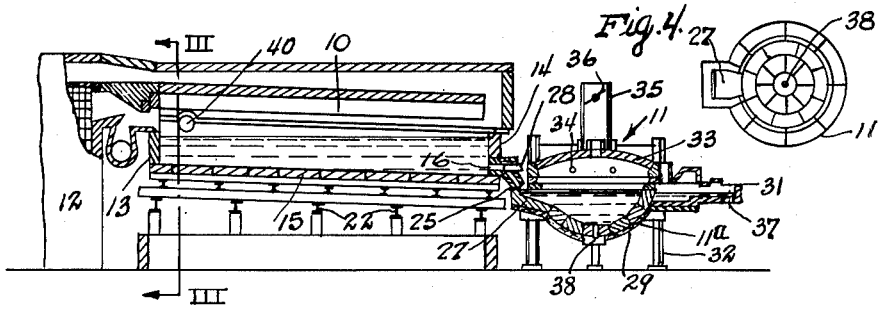
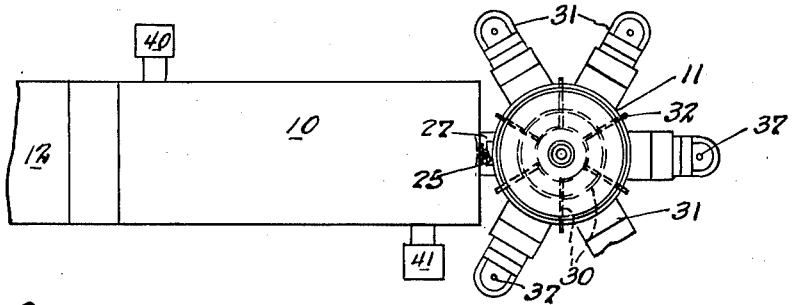
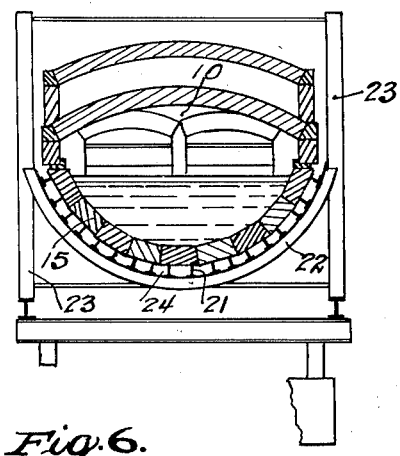
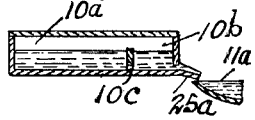
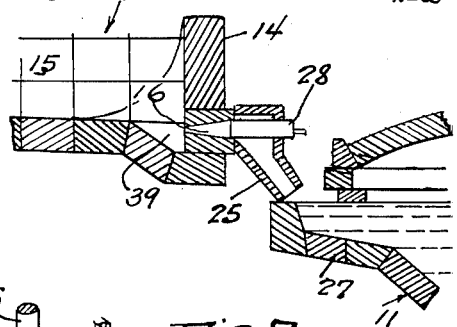
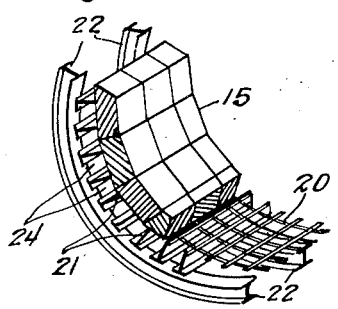
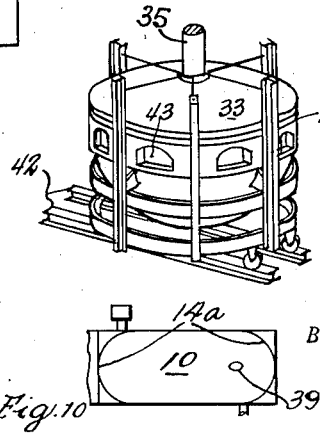
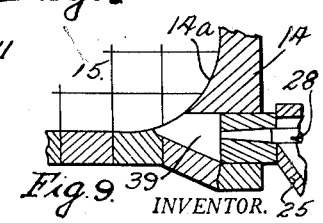
INVENTOR.
WILLIAM JOHN SMITH
BY
Olen E. Bee
ATTORNEY.

Patented Mar. 4, 1952

2,587,914

UNITED STATES PATENT OFFICE 2,587,914

METHOD OF MAKING GLASS

William John Smith, Point Piper, New South Wales, Australia, assignor to Industrial Developments Limited, Singapore, a corporation of Singapore Original application October 9, 1943, Serial No. 505,694. Divided and this application February 7, 1948, Serial No. 6,961. In Australia November 12, 1942

4 Claims. (Cl. 49—77)

This invention relates to improvements in and connected with methods of making glass.

The invention herein disclosed constitutes a division and is based upon my copending application Serial No. 505, 694, filed October 9, 1943, for Glass Melting Tank and Associated Working Chamber, which has become abandoned.

The type of glass tank now in general use comprises a large melting chamber and smaller working chamber, such chambers being separated by a bridge wall provided with a submerged passage or doghole through which the molten glass enters the working chamber. Both the melting chamber and the working chamber are of rectangular shape both in plan and in cross section and are covered by a common crown. The aforesaid bridge wall terminates below the crown so that the two chambers communicate above the glass level whereby the molten glass in the working chamber is subjected to the hot gases from the melting chamber.

The raw materials are delivered to the melting chamber at or near that end thereof which is remoted from the aforsaid bridge wall and working chamber.

The working chamber is also usually provided with one or more forehearths from which the molten glass is delivered by mechanical feeders or other devices to forming machines.

From the foregoing description it will be evident that the level of the molten glass in the working chamber and its associated forehearths is the same as that in the melting chamber and, as the level in the forehearths cannot vary more than two or three inches without interfering with the operation of the usual feeding devices, it follows that the level in the melting chamber must be maintained substantially constant. This is a disadvantage when it is necessary either to repair the refractory walls of the tank or to melt glass of a different composition therein because, in either case, the molten glass which it is necessary to discharge represents almost the full capacity of the tank. It is the general practice to granulate the glass so discharged and to use it as cullet in subsequent melting operations, but the discharge of such large quantities of molten glass (usually about 50 to 300 tons) involves a considerable loss of heat, the provision of granulating facilities of substantial size, and much labor.

Another disadvantage which accrues from the existing necessity of maintaining a substantially constant working level in the melting chamber is that week-end periods during which the forming machines are generally not operated cannot be utilized for the purpose of melting further glass to supply some of the requirements of the following week. This again involves a considerable thermal loss because the temperature must be maintained in the tank at all times.

Still another important disadvantage of glass tanks as at present constructed and in which, as already stated, the melting and working chambers communicate freely with each other above the glass level is that the temperature conditions in these two chambers are interrelated and cannot be controlled independently. As a result it is not generally possible to maintain the glass in either of these chambers at the optimum temperatures. That is to say the temperature in the melting chamber is generally lower and the temperature in the working chamber is generally higher than the optimum temperatures for these respective chambers.

A further disadvantage of the usual construction of tank briefly described above is that "dead" areas of stagnant glass are formed at and near the square corners between the bottom and the walls both in the melting chamber and in the working chamber and, when the glass in these areas is disturbed as it frequently is due to various causes, heterogeneous glass passes to the feeding devices. Furthermore considerable heat is required to maintain the temperature of the glass in these dead areas.

The rectangular plan form of the usual working chamber also imposes a limit on the number of machines which can be supplied therefrom because, in general, it is not practicable to extend the working chamber laterally, not only because the space required would be considerably greater but also because it would be difficult to maintain the requisite temperature and composition at and adjacent the ends of a laterally elongated working chamber, as well as for other reasons.

The vertical refractory walls of the tank in contact with the molten glass and particularly the walls of the melting chamber, progressively deteriorate under the severe conditions to which they are subjected. These walls are generally formed of large refractory blocks which are laid in courses in the manner of bricks so that vertical and horizontal joints are formed therebetween.

It is found that these horizontal joints are penetrated by the molten glass and gases which "drill" upwardly—i. e. produce upwardly extending cavities in the downwardly facing surfaces of the blocks with the result that large portions of the front faces of the blocks occasionally break away. The vertical faces of the walls are also eroded by the downwardly moving convection currents which are set up in the molten glass in contact therewith.

Now the general object of the present invention is to provide improvements in the melting of glass products and in methods of operation of glass producing tanks whereby the above mentioned disadvantages will be overcome or minimized.

Many improvements of this kind can be realized in a glass tank or furnace having a melting chamber and a working chamber so constructed and arranged that the working level of the glass in the working chamber is substantially below the normal level of the glass in the melting chamber and preferably below the level of the bottom of the melting chamber.

For this purpose adjustable valve means are provided for controlling the passage of glass from the melting chamber to the working chamber, such valve means being controllable either manually or automatically.

Preferably the floor of the melting chamber inclines downwardly to the outlet end and the discharge outlet is disposed substantially at or below the level of the lower end of the floor to permit of the discharge of the whole body of molten glass therein.

A salient feature of the invention resides in the manner of operating the melting chamber and working chamber concurrently during one period and/or separately at the same period or at different periods, such operations being facilitated by controlled flowing of molten glass along an inclined passageway leading from the melting chamber to the working chamber.

Another feature of the invention involves the production of improved quality of molten glass in connection with the passage of such glass from a melting chamber at a higher level to a working chamber at a lower level, and in the improved operation of the working chamber in its capacity for variations resulting from its association with the melting chamber.

The said working chamber or basin, as it may be termed, is preferably of substantially hemispherical shape—that is to say, it is substantially of semi-circular shape in cross section whereby the movement of convection currents is facilitated to promote homogeneity of temperature and composition while the area decreases in the downward direction so that there is less glass at the lower levels to be heated by conduction through the supernatant glass. Furthermore the hemispherical form of the basin eliminates the aforesaid "dead" areas which exist adjacent the corners of a working chamber of the usual construction.

The basin is covered by a suitable crown which may be provided centrally with a vertical outlet flue fitted with a damper to facilitate temperature control. Reheat burners may also be arranged above the glass level in substantially the usual way.

A salient feature of the invention resides in so constructing the working chamber or basin as to permit of its being moved for the purpose hereinafter described.

Still another feature of the invention resides in the operations of charging the melting chamber with glass-making batch by supplying such batch through feeders and dog houses adjacent both or either end of the melting chamber.

The invention also includes an improved method of operating a glass tank as above described and comprising maintaining a substantially constant level of glass in the working chamber irrespective of variations in the level in the melting chamber.

The melting chamber may be of rectangular shape in plan while the end walls may be vertical. Alternatively either or both ends of the melting chamber may be of semi-circular shape when viewed in plan and of quadrant shape in sectional elevation—that is to say, either or both ends may constitute substantially a quarter of a sphere.

Other objects and features of the invention are hereinafter described with reference to the accompanying drawings in which:

Fig. 1 is a longitudinal vertical section of a glass melting tank constructed according to the invention; Figure 2 is a fragmentary plan of the structure shown in Fig. 1; Figure 3 is a fragmentary vertical section taken substantially along the line III—III of Fig. 1; Figure 4 is a plan of a working basin with the crown removed; Fig. 5 is a fragmentary vertical section, on a larger scale, of adjacent and cooperating parts of melting and working chambers and involving an alternative form of structure; Fig. 6 is a fragmentary perspective showing details of construction of the melting chamber; Fig. 7 is a perspective of a portable working chamber; Fig. 8 is a diagrammatic vertical section illustrating another form of tank structure; Fig. 9 is a fragmentary vertical section similar to Fig. 5 and illustrating a curved type of end construction for the tank; and Fig. 10 is a diagrammatic plan similar to Fig. 2 and illustrating curved portions corresponding to those featured in Fig. 9.

Referring now to the drawings, the reference numeral 10 designates an elongated melting chamber having a separate working chamber or basin 11 arranged closely adjacent one end thereof, and a recuperator 12 arranged at the opposite end, though alternatively the tank may be of the regenerative type.

The melting chamber is of rectangular shape when viewed in plan, the end walls 13 and 14 being arranged vertically in the usual way while in transverse cross section (see Fig. 3) the glass holding basin 15 of the tank is substantially semi-circular in shape and is formed, as far as possible, of refractory blocks of identical shape, thus facilitating the construction of the tank.

The glass holding portion 15 of the tank inclines downwardly from the recuperator and to the opposite end 14 thereof and an outlet opening 16 is provided in the wall at the outlet end, such opening being close to the bottom of the adjacent end of the floor whereby substantially all of the molten glass therein may be discharged therethrough.

The refractory blocks forming the glass holding basin 15 of the tank are preferably bedded on wire mesh 20 (Fig. 6) supported on longitudinally disposed inverted T-beams 21 the webs of which are disposed substantially radially with respect to the center of curvature of the basin. The flanges of these T-beams rest on the upper surfaces of a plurality of longitudinally spaced transverse cradles 22 of semi-circular form and these in turn are supported on suitable upright pillars 23.

If desired, cooling air may be circulated through one or more of the longitudinally extending channels 24 between the T-beams 21 and in contact with the outer surface of the semi-circular basin of the melting chamber.

The semi-circular transverse shape of the glass holding portion 15 of the melting chamber provides several advantages in operation as well as in construction and some of these have been briefly referred to above. Thus the flow of convection currents is facilitated and erosion of the walls accordingly minimized. These currents flow outwardly at the surface of the glass to the side walls which exercise a cooling effect, and then downwardly in contact therewith and finally upwards at or about the longitudinal axis of the tank. In this way homogeneity of temperature and composition is promoted.

Furthermore the elimination of the sharp corners which exist in tanks of ordinary construction obviates the formation of dead areas of stagnant glass and the disadvantages attendant thereon.

In addition it will be clear that the area of the tank progressively decreases in the downward direction and this is thermally advantageous because there is less glass below the surface to be heated by convection or by conduction through the supernatant layers thereof.

Finally the improved construction herein described minimizes the tendency for the molten glass to penetrate the longitudinal joints between the refractory blocks and to "drill" upwardly therefrom; firstly because of the substantial elimination of dead areas; secondly because the walls incline upwardly and outwardly from each longitudinal joint; and thirdly because the planes of these longitudinal joints are not horizontal but substantially radial to the center of curvature.

It will be noted that, although the cross-sectional shape of the tank has been described as being semi-circular, it is actually semi-polygonal, a close approach to the semi-circular form being obtained with flat faced refractor blocks which are more convenient to manufacture.

Furthermore it is to be noted from Figure 3 that the center of curvature is advantageously disposed somewhat above the maximum level of the glass so that the side walls incline upwards and outwards at that position.

If desired, either or both of the ends of the melting chamber may be of semi-circular shape in plan and of quadrant shape in longitudinal section, as indicated at 14a in Figs. 9 and 10, thus obviating the formation of sharp corners at the ends also. The remainder of the melting chamber corresponds substantially to that shown in Figs. 1, 2, and 5.

The working chamber or basin 11 is of circular shape in plan and is constructed independently of the melting chamber 10 though it is located adjacent to the outlet end thereof.

The working level of the molten glass in the working basin is disposed below the level of the bottom of the melting chamber and an inclined chute 25 is arranged in the central longitudinal plane of the melting chamber to deliver the molten glass discharged through the hole 16 in the end wall 14, into a radial receiving trough 27 formed in the adjacent peripheral portion of the basin.

The discharge of molten glass from the melting chamber into the chute 25 is controllable by a refractory valve member 28 which is reciprocable to and from the discharge outlet 16, such valve member, which is preferably water cooled, being operated manually or automatically in accordance with variations in the level of glass in the basin.

The working basin 11 is of semi-circular shape in cross-section—that is to say, it is substantially hemispherical in form as shown, thus eliminating all corners and their attendant dead areas and providing the other advantages hereinbefore referred to. The refractory blocks forming the basin are preferably arranged radially about a central circular block (see Fig. 4) thus facilitating construction, and these blocks may be bedded on wire mesh 29 supported on a cradle 30 formed of inverted T-beams, the whole being carried on columns 32. In the particular embodiment shown, the basin constitutes rather less than a complete hemisphere, the center of curvature being disposed somewhat above the top thereof whereby the upper layer of blocks inclines upwards and outwards as shown in Figure 1, though various cross sectional shapes may be used.

An external lining 11a of heat insulating material is applied to the basin to reduce the loss of heat therefrom.

The basin is covered by a suitably supported crown 33 below which one or more reheat burners 34 may be arranged and a central vertical flue or chimney 35 extends upwards from the center of the crown; said flue being fitted with a suitable damper 36. Thus the temperature conditions in the basin may be regulated.

The basin is also provided with a plurality of radially arranged forehearths 31 which may be fitted with suitable feeding means of known type (not shown) by means of which the molten glass may be directed to associated forming machines through discharge openings 37. The circular form of the basin and its arrangement at a lower level than the bottom of the melting tank enables a larger number of machines to be arranged about and supplied from a working chamber than has heretofore been practicable.

A discharge opening normally fitted with a plug 38 is provided in the bottom of the basin to enable the molten glass to be discharged therefrom when desired.

From the foregoing description it will be evident that the maintenance of the required working level in the basin is not dependent upon the level of molten glass in the melting chamber with the result that several important operating advantages are obtained.

Thus melting may proceed at the full capacity of the tank throughout the week (including the week-end) in order that, during the periods when the machines are in operation, the molten glass may be used at a greater rate than the rate of melting. When operated in this way the glass level would fall progressively throughout the working week but would be restored by the glass melted during the week-end.

Another important advantage is that, as the melting and working chambers are quite separate, each such chamber may be operated at the optimum temperature therefor.

Furthermore, if it becomes necessary to empty the melting chamber either for the purpose of reconstructing it or to enable glass of a different composition to be melted therein, it is possible to discontinue the supply of the batch materials and eventually to discharge substantially all of the molten glass into the basin before the tank is shut down. Thus the only glass which cannot be utilized by the forming machines is the relatively small quantity which is present in the basin when the melting chamber is empty. This again provides a considerable saving of fuel and reduces the labor and equipment which would otherwise be required to granulate and handle the discharged glass. The complete discharge of molten glass from the melting chamber 10 is facilitated if the discharge outlet 16 communicates with a well or sump 39 in the floor of the melting chamber as shown in Fig. 5.

It will be clear that these operating advantages accrue from arranging the basin or working chamber at a lower level than the melting chamber in conjunction with suitable means for controlling the flow of molten glass thereinto, and that they do not depend upon the novel constructional features of the chambers previously described. Thus this form of the invention is not limited to melting and working chambers constructed as hereinbefore described.

Likewise the approximately semi-circular cross-sectional form of the melting chamber is applicable also to glass tanks of the usual type in which case the usual working chamber also is preferably of semi-circular shape in cross-section.

With the usual glass tank, which has a working chamber at one end and separated from the melting chamber by a bridge wall provided with a submerged opening generally termed a doghole, it is essential to deliver the batch materials to the tank at or adjacent that end thereof which is remote from the refining chamber.

However, when the working chamber is entirely separate from the melting chamber as herein described, it is possible to provide one or more additional dog houses, stokers or other batch feeding means adjacent the outlet end of the tank, thus reducing the time required for refilling particularly at the week-ends. Thus it will be noted that in Fig. 2 a stoker 40 is arranged in the usual position while an additional stoker 41 is arranged diagonally opposite thereto and near the discharge end.

The stoker 41 would not ordinarily be used while molten glass was passing to the basin 11 as unmelted batch materials would be liable to pass thereinto, but, as already indicated, such additional stoker or one or more equivalent dog houses would facilitate the operation of refilling the tank at week-ends and other periods when molten glass is not being discharged.

According to another form of the invention, the basin 11 is portable as shown somewhat diagrammatically in Fig. 7 whereby, after it has been filled from the tank 10, it may be transported on rails 42 to another location where the glass therein is used either by hand workers or by suitably feeding it to fabricating machines, the basin shown in this figure being provided with openings 43 suitable for manual workers, though it may, if desired, be adapted for the discharge of glass therefrom by mechanical feeders if the latter and/or the temperature of the glass are suitably regulated to compensate for variations in the glass level. In lieu of transporting the basin on rails it may be arranged to be moved by an overhead crane or in any other convenient way.

It is proposed that a number of portable basins as above described be employed in association with the melting tank so that they may be filled in succession and then transported to the desired working locations so that one tank may supply the glass required for a large number of fabricating machines and/or manual workers, such basins being returned to the tank for refilling when necessary.

With the usual glass tank there is a definite limit to the number of machines or manual workers which or who can be conveniently accommodated about the working end of the tank but by means of portable basins as herein described this disadvantage is overcome and the full melting capacity of the tank may be utilized, while additionally a more efficient layout of plant is possible and the working conditions for the operatives are improved. This is particularly true in the case of hand workers who usually work from melting pots arranged in a circular pot furnace. Thus operatives may be working from one pot while a fresh batch is being melted in a neighboring pot which therefore requires to be heated to a higher temperature.

While it is preferred to employ basins of hemispherical form, it will be evident that the invention is not limited thereto.

The aforesaid fixed or portable basins may also be used in connection with the manufacture of window glass and other flat glass including plain, colored and opal glass.

While, as above described, the molten glass passes direct from the melting chamber to a working chamber arranged at a lower level, another chamber could be interposed. For example, a working chamber as herein described could be arranged adjacent to the working end of a glass tank of ordinary construction, the molten glass then gravitating from the usual working chamber into the working chamber through a valve controlled opening. This is shown diagrammatically in Fig. 8 in which 10a designates the melting chamber of an ordinary glass tank, 10b the working chamber 10c the doghole, and 11a the basin or actual working chamber to which molten glass is delivered under the control of a valve (not shown) corresponding to the valve 23 and by means of a chute 25a from the chamber 10b.

I claim:

1. A method of making glass which comprises melting glass making batch into the form of a primary molten glass bath substantially filling a melting chamber while substantially continuously feeding glass batch to the glass bath, flowing molten glass from the bottom of the primary glass bath into a working chamber during a predetermined period of operation while also maintaining continuous feeding of the batch to the bath, maintaining the flow of molten glass from the primary bath into the working chamber at said predetermined period of operation at a rate greater during such period than the rate of continuous feeding of the glass batch to the primary bath and thereby progressively lowering the level of the primary bath.

2. A method of making glass which comprises melting glass making batch into the form of a primary molten glass bath in a melting chamber, discharging at intervals molten glass from the bottom of one extremity of the glass bath, feeding glass batch to the bath at a location adjacent the extremity of the glass bath from which the molten glass is discharged and also feeding glass batch to the bath at an extremity thereof substantially opposite the discharging location of the molten glass, discontinuing the feeding of glass batch to the location adjacent the discharging location while molten glass is being discharged from the bottom of said glass bath, flowing the molten glass from its discharging point into a working chamber, and maintaining the level of the discharged molten glass in said working chamber at least as low as the bottom of the molten glass bath in the melting chamber.

3. A method of making glass in, and supplying same from, a melting furnace operable continuously over a predetermined period, said method comprising maintaining a primary bath of molten glass in a melting chamber by melting batch therein at a predetermined rate, supplying molten glass by gravity flow from the bottom portion of said primary bath to form and maintain a secondary glass bath in a working chamber arranged at a lower level, whereby the primary bath constitutes a reservoir of molten glass for said secondary bath, withdrawing glass for fabrication from said secondary bath, controlling said flow of glass to the secondary bath so as to maintain the level of the latter substantially constant during a predetermined period, periodically interrupting the withdrawal of glass from said secondary bath, while melting of batch is continued whereby the volume of glass stored in said primary bath is increased substantially and at intervening times withdrawing glass from the primary bath at an average rate exceeding the average rate at which batch is melted whereby the volume of glass stored in the primary bath is substantially reduced.

4. A cyclic method of making glass in, and supplying same from, a melting furnace operable continuously over a predetermined period, said method comprising maintaining a primary bath of molten glass by substantially continuously supplying batch to one extremity thereof and melting same, supplying molten glass by gravity flow from the bottom portion of the primary bath at an extremity thereof substantially opposite the first mentioned extremity and directing same to form and maintain a secondary bath of molten glass in a working chamber disposed at a lower level, whereby said primary bath constitutes a reservoir of molten glass for said secondary bath, withdrawing molten glass for fabrication from said secondary bath, controlling said flow of molten glass from the primary bath so as to maintain the level of said secondary bath substantially constant during a predetermined period, periodically interrupting for intervals of at least twelve hours, the withdrawal of glass from said secondary bath whereby the volume of glass stored in said primary bath is correspondingly increased and at intervening times withdrawing glass from said secondary bath at an average rate such that the volume of glass supplied to said secondary bath during each such intervening period is substantially equal to the volume of glass produced by the melting of batch during each complete cycle of operations.

WILLIAM JOHN SMITH.

REFERENCES CITED

The following references are of record in the file of this patent:

UNITED STATES PATENTS

| Number | Name | Date |
| --- | --- | --- |
| 762,270 | Benjamin | June 14, 1904 |
| 1,596,058 | Mambourg | Aug. 17, 1926 |
| 1,834,631 | Mulholland | Dec. 1, 1931 |
| 1,872,664 | Brown | Aug. 23, 1932 |
| 1,883,023 | Slick | Oct. 18, 1932 |
| 1,928,016 | Halbach et al. | Sept. 26, 1933 |
| 1,928,598 | Morton et al. | Sept. 26, 1933 |

FOREIGN PATENTS

| Number | Country | Date |
| --- | --- | --- |
| 31,935 | Germany | July 10, 1885 |
| 204,189 | Switzerland | Apr. 30, 1939 |